US008143334B1

(12) United States Patent
Froess, Jr.

(10) Patent No.: US 8,143,334 B1
(45) Date of Patent: Mar. 27, 2012

(54) PEANUT SHELL PRESS BOARD AND METHOD OF MAKING

(76) Inventor: John L. Froess, Jr., Erie, PA (US)

( * ) Notice: Subject to any disclaimer, the term of this patent is extended or adjusted under 35 U.S.C. 154(b) by 173 days.

(21) Appl. No.: 12/291,864

(22) Filed: Nov. 14, 2008

Related U.S. Application Data

(63) Continuation-in-part of application No. 11/479,534, filed on Jun. 30, 2006, now abandoned.

(51) Int. Cl.
*B27K 5/00* (2006.01)
*B27K 3/00* (2006.01)
*C08K 11/00* (2006.01)

(52) U.S. Cl. .......................................... 524/15; 264/109

(58) Field of Classification Search .................... 524/15; 264/109
See application file for complete search history.

(56) References Cited

U.S. PATENT DOCUMENTS

| | | | | | |
|---|---|---|---|---|---|
| 2,440,789 | A | * | 5/1948 | Van der Pyl | 525/54.21 |
| 3,382,197 | A | * | 5/1968 | Purcell | 524/733 |
| 3,674,894 | A | * | 7/1972 | Economy et al. | 525/49 |
| 3,850,677 | A | * | 11/1974 | Vasishth | 524/15 |
| 3,927,235 | A | * | 12/1975 | Chow | 428/292.4 |
| 4,203,876 | A | * | 5/1980 | Dereppe et al. | 524/9 |
| 4,311,621 | A | * | 1/1982 | Nishizawa et al. | 524/13 |
| 4,572,815 | A | * | 2/1986 | Kaiser | 264/115 |
| 4,882,112 | A | * | 11/1989 | Maki et al. | 264/109 |
| 5,076,986 | A | * | 12/1991 | Delvaux et al. | 264/122 |
| 5,416,139 | A | * | 5/1995 | Zeiszler | 524/13 |
| 5,874,486 | A | * | 2/1999 | Bastioli et al. | 523/128 |
| 5,891,937 | A | * | 4/1999 | Berg et al. | 524/13 |
| RE37,683 | E | * | 4/2002 | Briddell et al. | 428/42.2 |
| 6,624,217 | B1 | * | 9/2003 | Tong | 524/9 |
| 6,835,764 | B2 | * | 12/2004 | Leckey et al. | 524/15 |
| 7,037,959 | B1 | * | 5/2006 | Willett et al. | 524/13 |
| 2003/0229160 | A1 | * | 12/2003 | Williams et al. | 524/13 |
| 2004/0038017 | A1 | * | 2/2004 | Tutin et al. | 428/297.4 |
| 2005/0165137 | A1 | * | 7/2005 | Sivasithambaram Pillai et al. | 524/15 |
| 2006/0115625 | A1 | * | 6/2006 | Brown | 428/151 |

FOREIGN PATENT DOCUMENTS

| | | | | |
|---|---|---|---|---|
| CN | 1485185 | A | * | 3/2004 |

OTHER PUBLICATIONS

Machine translation of CN 1485185 2010.*

Han et al. Journal of Applied Polymer Science, vol. 34, 793-813, 1987.*

* cited by examiner

*Primary Examiner* — Liam Heincer

(74) *Attorney, Agent, or Firm* — Richard K Thomson

(57) ABSTRACT

A press board for use in construction is made of unreduced peanut shells and a polyester resin binder. The preferred formulation has 87-92% by weight peanut shells and 8-13% binder. The method of manufacturing involves curing the formulation in a 100 ton press at temperatures in the range of 29-380° F. for periods of from 5-8 minutes.

5 Claims, No Drawings

PEANUT SHELL PRESS BOARD AND METHOD OF MAKING

This application is a continuation-in-part of U.S. patent application Ser. No. 11/479,534 filed Jun. 30, 2006 now abandoned.

BACKGROUND AND SUMMARY OF THE INVENTION

The present invention is directed to the construction industry. More particularly, the present invention is directed to a construction or press board made of peanut shells.

The peanut industry has always had a problem: what do you do with the shells after they have surrendered their fruit? The shells are resistant to breakdown by weather and insects which are normally involved in the bio-degradation of similar materials such as wood, simply are not interested in peanut shells. Accordingly, the shells are piled in huge mounds which significantly overburden the land fills. Further, burning is not an option due in part to the fire resistance of the shells and due in part to the air pollution problem such incineration would create. Peanut farmers would gladly pay someone to haul them off just to be rid of them.

Couple that with the recent rebuilding going on in the southeastern US due to hurricane damage to homes, which has led to the demand for plywood outstripping the supply capabilities of the industry, and what you have is a tremendous opportunity to solve two problems at once. The present invention forms construction board of the spent peanut shells, removing the burgeoning landfill problem in Georgia and surrounding peanut farming states. The same characteristics of peanut shells which make them a disposal problem—resistance to weather degradation, pest-aversion, and fire-retardance—make them an excellent building material. Further, unlike trees which need 30-40 years to repopulate a forest and provide the resources for the lumber mill, peanuts are an annually renewable crop.

The composite construction board of the present invention comprises 87-92% by weight unreduced peanut shells; 8-13% by weight polyester binder formulation; whereby said peanut shells and polyester binder are combined in a press where they are subjected to sufficient temperature and pressure to form a sheet of construction board. More preferably, binder content comprised 11% by weight and the amount of shells 89% by weight. The polyester binder formulation comprises 98.33% by weight unsaturated polyester resin, 0.52% by weight a first catalyst/initiator; 1.05% by weight a second catalyst initiator; and, 0.10% by weight a promoter/exothermic depressant.

The method of making the composite construction board comprises the steps of placing a Mylar® or other plastic release sheet in a press having a rating of at least 100 tons; pouring a blend of 87-92% peanut shells, 8-13% polyester binder formulation into the press; subjecting said blend to at least 100 tons pressure at a temperature in a range from between 290° and 380° F. for a time period in a range between 5 and 8 minutes; and, removing a resulting sheet of composite construction board from the press and allowing it to cool to room temperature.

Various other features, advantages, and characteristics of the present invention will become apparent after a reading of the following detailed description.

DETAILED DESCRIPTION OF THE PREFERRED EMBODIMENT(S)

It is envisioned that this construction board made in accordance with the teachings of this invention will be available in ½", ⅝" and ¾" thicknesses, with other thicknesses being possible. A MYLAR or other plastic release sheet was placed in a press with at least a 100 ton rating and then quantities of peanut shells and binder were added to the press, and cured for periods of 5-8 minutes at 100 tons pressure at temperatures ranging from 290-380° F. While various binder formulations were tried, the one producing the best results was a polyester binder formulation with the following make up:

98.33% by weight unsaturated polyester resin,
0.52% by weight a first catalyst/initiator;
1.05% by weight a second catalyst initiator; and,
0.10% by weight a promoter/exothermic depressant.

A number of combinations of peanut shells in the range between 87-92% by weight and binder making up the balance of 8-15% weight percent of the above identified polyester binder were tried. Test Sample I was 98 grams of resin combined with 785 grams of peanut shells in the 100 T press cured at a temperature of 290° F. for 8 minutes. This proved to be the best sample produced and will be the initial production formulation since it passed the nail pullout and weatherability tests. Test Sample II made from 100 grams resin and 800 grams shells cured at 380° F. for 1 minute and Test Sample III having 100 grams of resin and 800 grams shells cured at 380° F. for 5 minutes produced boards with slightly inferior characteristics. Some prior art patents grind up peanut (or other nut) shells to add to construction materials. However, peanut shells have a natural tensile strength that is destroyed by grinding them into a pulp. The present invention proposes to take advantage of this inherent strength by using unreduced peanut shells to form the construction board.

The present invention solves the problem of what to do with the peanut shells which are overburdening the landfills of Georgia and, further, provides a weather and pest resistant construction press board which is naturally fire-retardant. Given the success of press board made of wood shavings which have significantly penetrated the plywood market, the peanut shell construction board of the present invention which has significant advantages over such particle board, should meet with widespread acceptance in the construction industry.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A composite construction board comprising
a) 87-92% by weight unground peanut shells;
b) 8-13% by weight polyester binder formulation;
whereby said unground peanut shells and polyester binder are combined in a press where they are subjected to sufficient temperature and pressure to form a sheet of construction board.

2. The composite construction board of claim 1 wherein the amount of binder comprises 11% by weight and the amount of said unground peanut shells comprises 89% by weight.

3. The composite construction board of claim 2 wherein said polyester binder formulation comprises
98.33% by weight unsaturated polyester resin;
0.52% by weight a first catalyst/initiator;
1.05% by weight a second catalyst/initiator; and
0.10% by weight a promoter/exothermic depressant.

4. A method of making a composite construction board comprising the steps of a) placing a release sheet in a press having a rating of at least 100 tons;

b) pouring a blend of 87-92% unground peanut shells and 8-13% polyester binder formulation into the press;

c) subjecting said blend to at least 100 tons pressure at a temperature in a range from between 290° and 380° F. for a time period in a range between 5 and 8 minutes;

d) removing a resulting sheet of composite construction board from the press and allowing it to cool to room temperature.

5. A composite construction board manufactured by the method of claim 4.

* * * * *